(12) United States Patent
Simkowski

(10) Patent No.: US 6,736,573 B1
(45) Date of Patent: May 18, 2004

(54) SELECTIVE CONVEYING OF UNSTABLE ARTICLES HAVING A NECK RING

(75) Inventor: Donald J. Simkowski, Loveland, CO (US)

(73) Assignee: Goldco Industries, Inc., Loveland, CO (US)

( * ) Notice: Subject to any disclaimer, the term of this patent is extended or adjusted under 35 U.S.C. 154(b) by 0 days.

(21) Appl. No.: 10/283,900

(22) Filed: Oct. 30, 2002

(51) Int. Cl.[7] .............................................. B65G 51/18
(52) U.S. Cl. ........................ 406/88; 406/195; 198/836.4
(58) Field of Search .................. 406/88, 195; 198/836.4

(56) References Cited

U.S. PATENT DOCUMENTS

| | | | |
|---|---|---|---|
| 4,284,370 A | | 8/1981 | Danler et al. |
| 4,724,035 A | | 2/1988 | Mann et al. |
| 5,028,174 A | | 7/1991 | Karass |
| 5,100,265 A | | 3/1992 | Mirkin |
| 5,147,153 A | | 9/1992 | Aidlin et al. |
| 5,161,919 A | | 11/1992 | Smith et al. |
| 5,299,889 A | | 4/1994 | Langenbeck |
| 5,464,483 A | * | 11/1995 | Avelis et al. ............... 134/25.4 |
| 5,484,237 A | | 1/1996 | Langenbeck |
| 5,516,239 A | | 5/1996 | Warren et al. |
| 5,810,516 A | * | 9/1998 | Ouellette ..................... 406/86 |
| 6,190,094 B1 | * | 2/2001 | Rediess et al. ............... 406/19 |
| 6,488,449 B1 | * | 12/2002 | Laquay et al. ................ 406/88 |

\* cited by examiner

Primary Examiner—Joseph A. Dillon
(74) Attorney, Agent, or Firm—Robert E. Harris

(57) ABSTRACT

A selective conveying device is disclosed for conveying unstable articles, such as plastic bottles, having a neck portion with a neck ring thereon. Neck ring supported unstable articles are conveyed in single file along an article conveying path established by first and second guide units with the guide units having spaced connectors with neck ring engagable elements thereon spaced different distances from one another to receive the neck portions of unstable articles having different size neck portions. A first actuator, such as a pneumatic or mechanical actuator, causes relative movement between the guide units so that unstable articles are conveyed along the article conveying path on the neck ring engagable portions of the first guide unit when in a first operating position or are conveyed along the article conveying path on the neck ring engagable portions of the second guide unit when in a second operating position. The unstable articles are urged along the article conveying path by a second actuator, such as an air conveyor and/or a movable belt.

20 Claims, 5 Drawing Sheets

SELECTIVE CONVEYING OF UNSTABLE ARTICLES HAVING A NECK RING

FIELD OF THE INVENTION

This invention relates to an article conveying device, and, more particularly, relates to selective conveying of unstable articles having a neck portion with a neck ring thereon.

BACKGROUND OF THE INVENTION

It is oftentimes necessary to convey articles between different locations, such as, for example, moving articles, such as bottles or containers, from one location to another in single file with movement of the articles often utilizing a movable belt, as is now well known.

In connection with movement of unstable articles, such as plastic containers or bottles, however, it has often been found necessary to utilize additional equipment in conveying the unstable articles due to the tendency of such articles to easily tip during movement.

When conveying unstable articles having a neck portion with a neck ring thereon, various arrangements have been suggested and/or utilized, including guides to engage the neck rings of the unstable articles and thereby suspend the articles, after which the unstable articles are urged along the path established by the guides by directing air toward the articles to urge the articles in a downstream direction (see, for example, U.S. Pat. Nos. 4,284,370 (Danler et al.), 4,724,035 (Mann et-al.), 5,028,174 (Karass), 5,100,265 (Mirkin), 5,147,153 (Aidlin et al.), 5,161,919 (Smith et al.), 5,299,889 (Langenbeck), 5,484,237 (Langenbeck), and 5,516,239 (Warren et al.)).

Such arrangements, however, often require additional equipment and/or time consuming equipment changes or rearrangement of the conveyor when different unstable articles need to be conveyed, and, particularly, when the unstable articles to be conveyed have different size neck portions requiring conveyor changes or rearrangement each time that the conveyor is to be utilized to convey unstable articles having neck portions of a different size than that of the unstable articles previously conveyed.

SUMMARY OF THE INVENTION

This invention provides a device for conveying unstable articles having neck portions with a neck ring thereon that is simple, requires a minimum of added equipment, and is capable of rapid change to accommodate conveying of articles having different size neck portions.

Unstable articles, such as plastic containers or bottles, having a neck portion with a neck ring thereon, are neck ring supported and are conveyed in single line along an article conveying path established by first and second guide units.

The guide units have spaced connectors that are now preferably formed as a portion of U-shaped channels having a bridging portion connected with the spaced connectors, and the spaced connectors have neck ring engagable elements thereon spaced different distances from one another so that the neck ring engagable elements of one guide unit receive the neck portions of articles having a size different from that received by the neck ring engagable elements of the other guide unit.

A first actuator preferably includes a pneumatic actuating unit (but could include other types of actuating units including, for example, a mechanical actuating unit) and a pneumatic control unit (but could include other types of control units, including, for example, a mechanical control unit) with the first actuator being utilized to cause relative movement between the first and second guide units to establish first and second operating positions of the device.

In the first operating position, the neck ring engagable elements of the first guide unit establish the article conveying path for articles having a neck portion of a first predetermined size, and, in the second operating position, the neck ring engagable elements of the second guide unit establish the article conveying path for articles having a neck portion of a different predetermined size from that of the articles conveyed by the first guide unit (i.e. the same article conveying path is established by the neck ring engagable elements of the first and second guide units but enable articles of different size to be urged along the article conveying path).

A second actuator preferably includes a pneumatic unit (but could include other types of units including, for example, a mechanical unit, such as a movable belt, or a combination of pneumatic and mechanical units such as an air conveyor and/or a movable belt) utilized to urge the unstable articles along the article conveying path then established by the first or second guide unit.

It is therefore an object of this invention to provide an improved unstable article conveying device.

It is another object of this invention to provide an improved device for selectively conveying unstable articles having a neck portion with a neck ring thereon.

It is another object of this invention to provide an article conveying device for conveying unstable articles having a neck portion with a neck ring thereon along an article conveying path established by either of a first or a second guide unit having spaced connectors with neck ring engagable elements thereon.

It is another object of this invention to provide an article conveying device for conveying unstable articles having a neck portion with a neck ring thereon that includes first and second guide units having neck ring engagable elements with the neck ring engagable elements of one guide unit spaced a distance different from that of the neck ring engagable elements of the other guide unit to enable selective conveying of unstable articles along an article conveying path established by the first and second guide units.

It is another object of this invention to provide an article conveying device for conveying unstable articles having a neck portion with a neck ring thereon that includes first and second guide units having differently spaced connectors with neck ring engagable elements thereon, a first actuator for causing relative movement between the first and second guide un s to establish different operating positions for conveying unstable articles along an article conveying Heath established by the first and second guide units, and a second actuator for urging the unstable articles along-the article conveying path. With With these and other objects in view, which will become apparent to one skilled in the art as the description proceeds, this invention resides in the novel construction, combination and arrangement of parts substantially as hereinafter described, and more particularly defined by the appended claims, it being understood that changes in the precise embodiments of the herein disclosed invention are meant to be included as come within the scope of the claims.

BRIEF DESCRIPTION OF THE DRAWINGS

The accompanying drawing illustrate complete embodiments of the invention according to the best mode so far devised for the practical application of the principles thereof, and in which.

DESCRIPTION OF THE INVENTION

Figure 1:
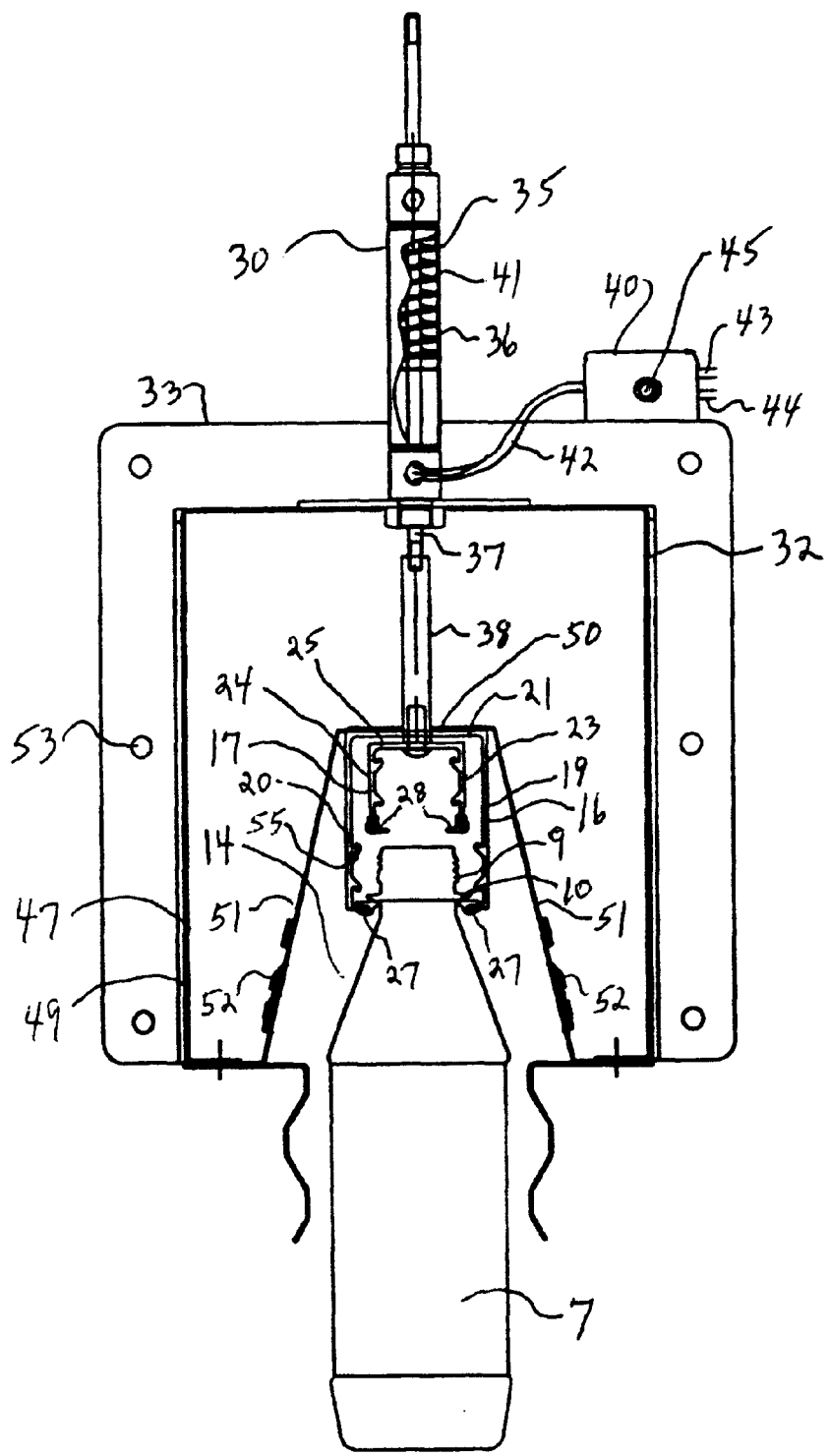
FIG. 1 is a cross-section end view of the device of this invention shown in a first operating position and utilizing air conveying of the unstable articles.
Figure 2:
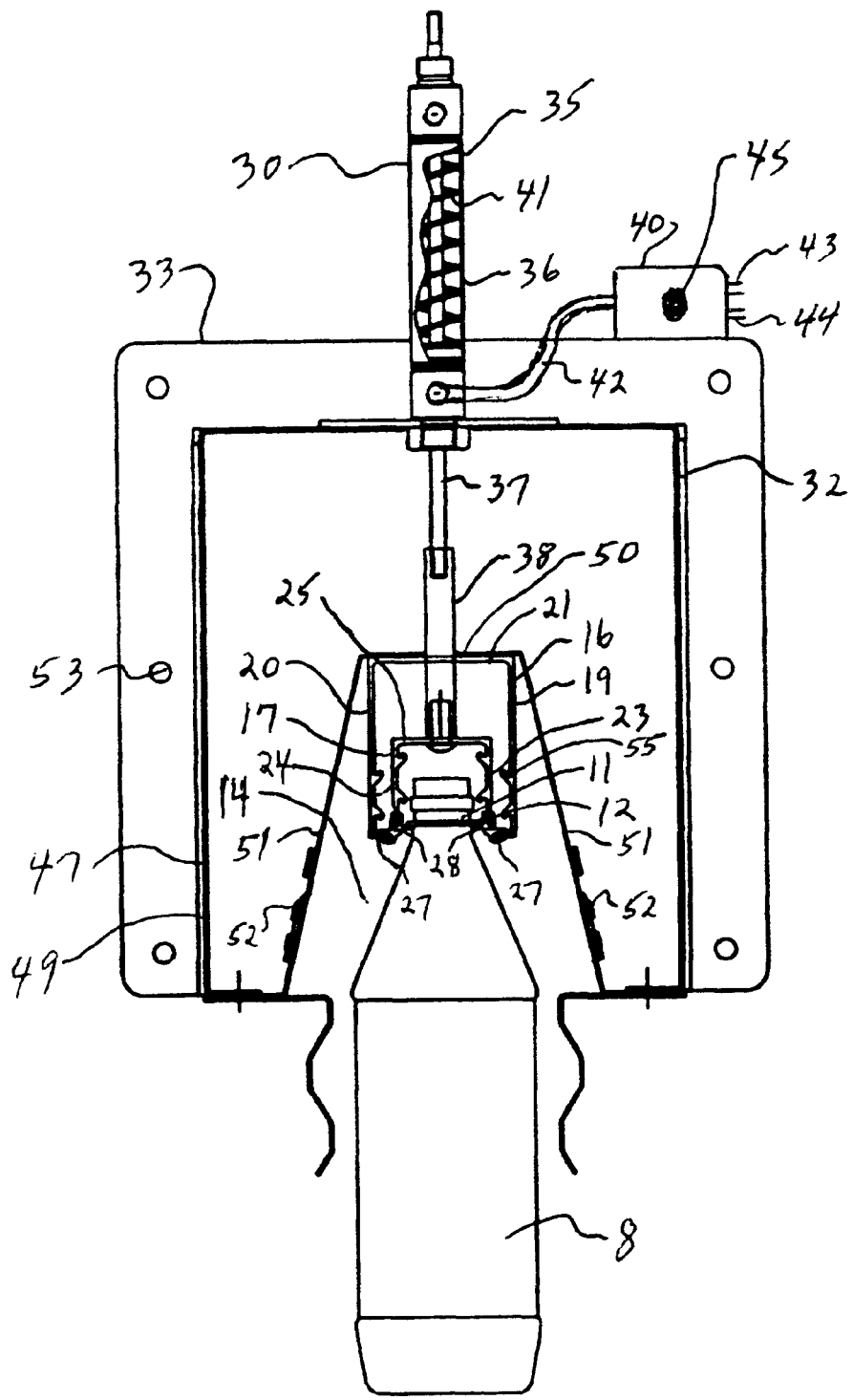
FIG. 2 is a cross-section view like that of FIG. 1 but shown in a second operating position.
Figure 4:
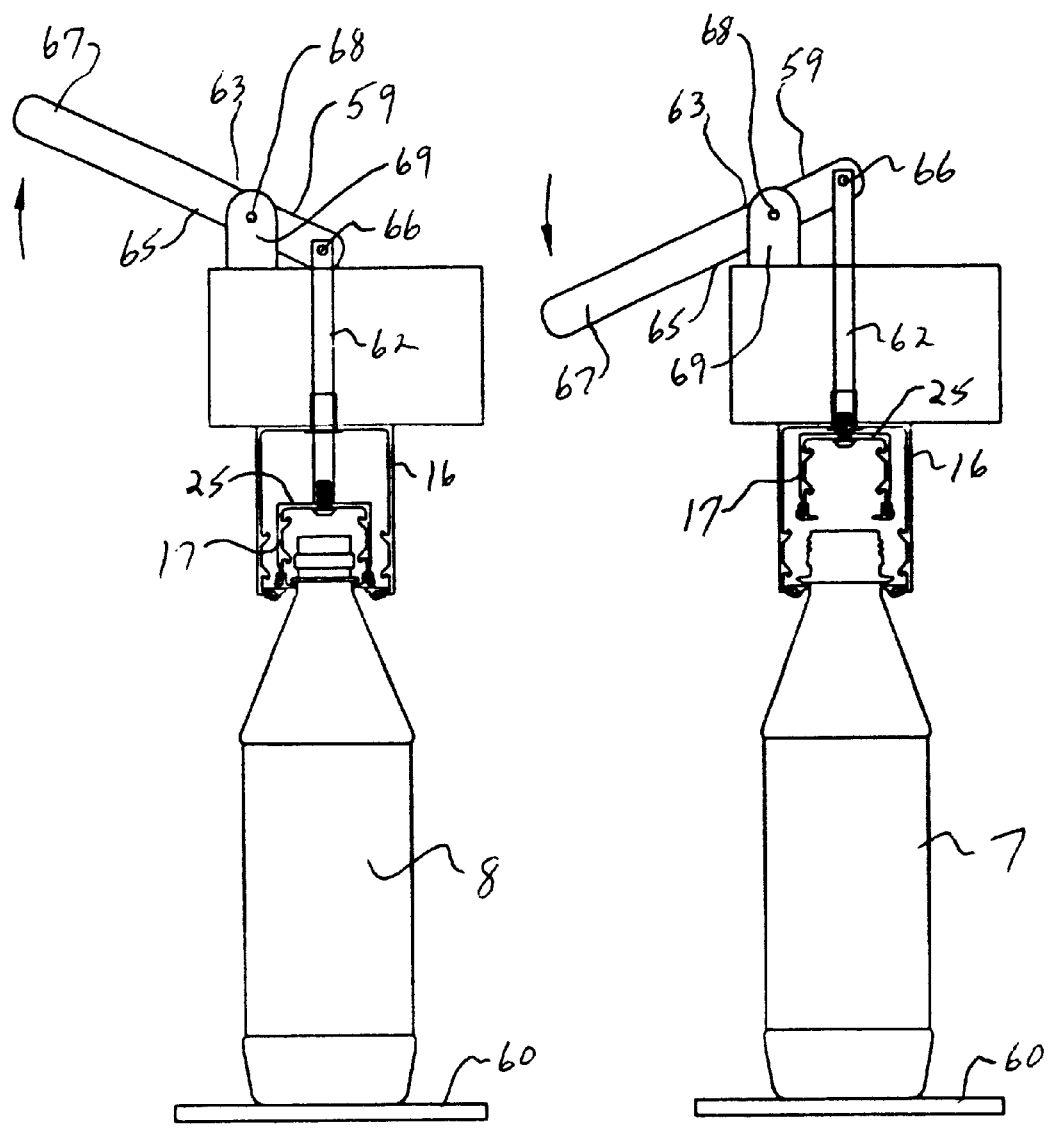
FIG. 4 is simplified cross-section views illustrating alternate embodiments of the first actuator for causing relative movement between the first and second guide units to establish the first and second operating positions and of the second actuator for urging the unstable articles along the article conveying path.

As best indicated in FIGS. 1, 2, and 4, articles 7 or 8 to be conveyed by the device of this invention are unstable articles, such as plastic containers or bottles, with unstable articles 7 having a neck portion 9 with neck ring 10 thereon, and with unstable articles 8 having a neck portion 11 with a neck ring 12 thereon.

Unstable articles 7 and 8 may be of different overall size with respect to one another and, as illustrated, unstable articles 7 have larger diameter neck portions and neck rings than the neck portions and neck rings of unstable articles 8. By way of example, unstable articles 7 may have a 35 mm finish neck portion while unstable articles 8 may have a 28 mm finish neck portion.

The unstable articles are conveyed in single file in the downstream direction (i.e., into the drawing sheet as illustrated in FIGS. 1, 2, and 4) along article conveying path 14, as established by first guide unit 16 to convey unstable articles 7 or as established by second guide unit 17 to convey unstable articles 8.

First guide unit 16 includes spaced connectors, or portions, 19 and 20 connected to the opposite ends of bridging connector, or portion, 21. Connectors 19, 20, and 21 are elongated and preferably straight (except where spaced connectors 19 and 20 have protrusions, or contouring, for adjustment purposes as brought out hereinafter) walls, or material sheets, and, as illustrated, form a substantially U-shaped channel, or channel member, (with preferably substantially parallel spaced connectors 19 and 20) with the channel extending lengthwise along the length of the first guide unit.

In like manner, second guide unit 17 includes spaced connectors, or portions, 23 and 24 connected to the opposite ends of bridging connector, or portion, 25. Connectors 23, 24, and 25 are also elongated and preferably straight (except where spaced connectors 23 and 24 have protrusions, or contouring, for adjustment purposes as brought out hereinafter) walls, or material sheets, and, as illustrated, form a substantially U-shaped channel, or channel member, (with preferably substantially parallel spaced connectors 23 and 24) with the channel extending lengthwise along the length of the second guide unit. As illustrated, second guide unit 17 is smaller than first guide unit 16 and is within first guide unit 16.

Each of the spaced connectors (19 and 20 of first guide unit 16 and 23 and 24 of second guide unit 17) have end portions that terminate with neck ring engagable elements, or portions (27 for connectors 19 and 20 and 28 for connectors 23 and 24) thereat.

Figure 3:
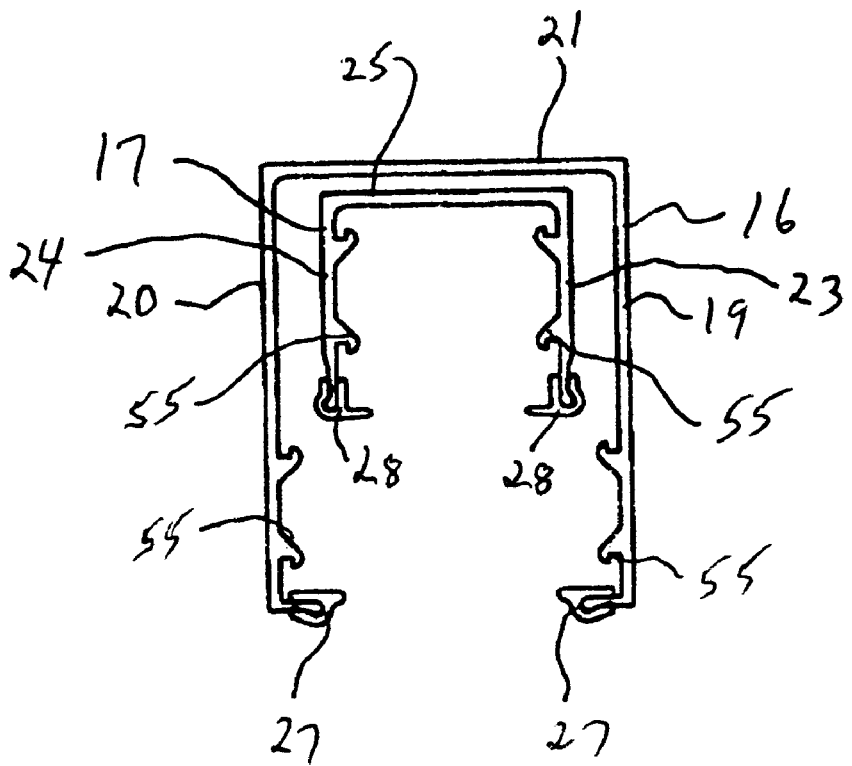
FIG. 3 is a cross-section view illustrating only the first and second guide units as shown in FIG. 1.

As indicated in the drawings, neck ring engagable elements 27 and 28 are preferably contact strips that, as best shown in FIG. 3, slip onto the free ends of the spaced connectors (as indicated, spaced connectors 19 and 20 have an inwardly directed flange to receive contact strips 27 while contact strips 28 are directly received in the downwardly extending spaced connectors 23 and 24, but could be otherwise connected and positioned as needed or desired, including using inwardly directed flanges at the free ends of the spaced connectors as neck ring engagable elements, or portions to engage the neck rings of the articles).

As shown in FIG. 1, neck ring engagable elements 27 of first guide unit 16 are spaced from neck ring engagable elements 28 of second guide unit 17 when in the first operating position of the device. This allows neck ring engagable elements 27 to receive neck portions 9 of unstable articles 7 therebetween so that the bottom portions of neck rings 10 of unstable articles 7 engage the top portions of neck ring engagable elements 27 to thus establish article conveying path 14 for unstable articles 7.

As shown in FIG. 2, neck ring engagable elements 28 of second guide unit 17 are above and adjacent to (and/or in contact with) neck ring engagable elements 27 of first guide unit 16 when in the second operating position of the device. This allows neck ring engagable elements 28 to receive neck portions 11 of unstable articles 8 therebetween so that the bottom portions of neck rings 12 of unstable articles 8 engage the top portions of neck ring engagable elements 28 to thus establish article conveying path 14 for unstable articles 8.

First actuator 30 is utilized to move one of guide units 16 and 17 relative to the other guide unit to establish the first and second operating positions of the device. As shown in the drawings and as described herein, first actuator 30 is connected with second guide unit 17 to move second guide unit 17 relative to first guide unit 16, but it is meant to be realized that first actuator 30 could instead be connected with first guide unit 16 to move first guide unit 16 relative to second guide unit 17.

As indicated in FIGS. 1 and 2, bridging connector 21 of first guide unit 16 is mounted on air plenum 32 mounted on mounting unit 33 and hence is fixed with respect to mounting unit 33, while bridging connector 25 of second guide unit 17 is connected with mounting unit 33 through first actuator 30.

The first operating position of the device is established, as indicated in FIG. 1, with neck ring engagable elements 27 of first guide unit 16 engaging neck rings 10 of unstable articles 7 to be conveyed, and the second operating position is established, as indicated in FIG. 2, with neck ring engagable elements 28 of second guide unit 17 engaging neck rings 12 of unstable articles 8 to be conveyed.

As shown in FIGS. 1 and 2, first actuator 30 is a pneumatic actuator that includes actuating unit 35 with air cylinder 36 and piston 37. Air cylinder 36 is connected with mounting unit 33 and piston 37 is connected with rod 38 connected with bridging connector 25 of second guide unit 17 so that piston 37 is withdrawn into air cylinder 36, as indicated in FIG. 1, to establish the first operating position of the device and is extended from air cylinder 36, as indicated in FIG. 2, to establish the second operating position of the device.

Control unit 40 of first actuator 30 is utilized to control air flow to the cylinder to cause the piston to be withdrawn. As shown spring 41, within air cylinder 36, causes the piston to be extended upon release of air from the air cylinder, but air could be introduced at each side of the piston within the air cylinder to cause the piston to be extended (as well as withdrawn), as is well known.

As indicated in FIGS. 1 and 2, control unit 40 is an air controller and is connected at one side to the lower inlet of air cylinder 36 through tube 42 and air is introduced into air cylinder 36 through tube 43 or expelled from air cylinder 36 through tube 44 depending upon the position of push button switch 45 (or alternately a rotary switch) controlling the direction of air movement (i.e., in one position of the push button switch air is introduced into the air cylinder and in the other position of the push button switch air is released from the air cylinder).

While not shown, it is meant to be realized that a plurality of first actuators may be utilized and spaced, as needed, along the article conveying path to commonly cause operating position selection, and the plurality of first actuators could be connected to operate through a single control unit.

Second actuator 47 is utilized to urge the unstable articles along article conveying path 14. As indicated in FIGS. 1 and 2, second actuator 47 is an air conveyor having air plenum 32 formed by outer walls 49, top inner wall 50 (having bridging connector 21 of first guide unit 16 connected therewith), and slanting inner walls 51. Air ducts 52 are formed in slanting inner walls 51 facing article conveying path 14 to direct air from air plenum 32 toward the unstable articles at article conveying path 14 with the air being directed at the unstable articles to urge the unstable articles in the downstream direction as is known in the art.

Air plenum 32 is connected with a conventional air supply system, normally by means of a tube (not shown), and adjacent sections of the air plenum (normally extending along the entire article conveying path) may be connected with one another utilizing apertures 53, as indicated in FIGS. 1 and 2, as, or in, mounting unit 33.

Figure 3A:
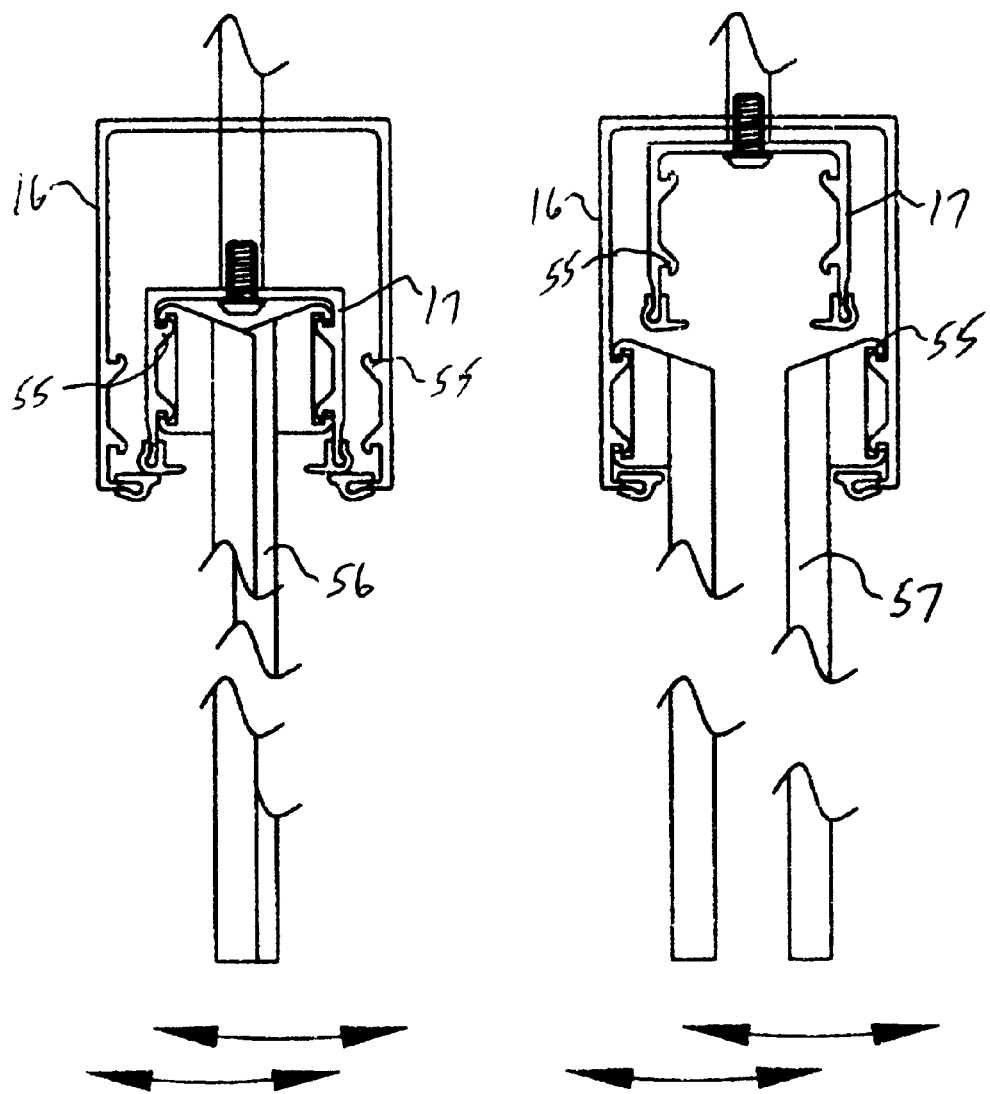
FIG. 3A is a partial cross-section view illustrating use of an adjustment tool for adjusting the spaced connectors of the first and second guide units for handling unstable articles having different size neck portions.

As indicated in the drawings, spaced connectors 19 and 20 (of first guide unit 16) and connectors 23 and 24 (of second guide unit 17) may include protrusions, or contouring, 55 to facilitate adjustment of the spaced connectors by means of adjustment tools 56 and 57 (as indicated in FIG. 3A), normally during set-up, to assure proper spacing between the spaced connectors.

First actuator 30 and second actuator 47 could be embodied other than as shown in FIGS. 1 and 2, as would be obvious to one skilled in the art, and alternate embodiments are shown, by way of example, in FIG. 4. With respect to first actuator 30, mechanical unit 59 is shown for establishing the first and second operating positions and, with respect to second actuator 47, movable belt 60 is illustrated for urging the articles along the article conveying path.

Mechanical unit 59 includes displaceable rod 62 connected at one end with bridging connector 25 of second guide unit 17 and connected at the other end with lever unit 63. Lever unit 63 includes rod 65, one end of which is connected with displaceable rod 62 by pivot pin 66 and the other end of which serves as handle 67, with rod 65 being mounted for pivotal movement about pin 68 mounted on ear 69 connected with mounting unit 33 so that pivotal movement of rod 65 in one direction moves second guide unit 17 in one direction relative to first guide unit 16 to establish the first operating position of the device and pivotal movement of rod 65 in the opposite direction moves second guide unit 17 in the opposite direction relative to first guide unit 16 to establish the second operating position of the device.

With respect to the alternate embodiment of second actuator 47, as shown in FIG. 4, movable belt 60 is positioned below the unstable articles to be moved along article conveying path 14 established by guide units 16 and 17 with the movable belt in contact with the bottoms of the unstable articles so that upon movement of movable belt 60 in the downstream direction, the unstable articles are urged in the downstream direction along the article conveying path. While not now preferred, second actuator 47 might, for some applications, include both air conveying and use of movable belt 60. While not shown, movable belt 60 is normally moved by a belt actuator as is well known in the art.

In normal operation to convey, at different times, unstable articles having predetermined different size neck portions, the desired operating positions (based upon each size of the different size neck portions of the unstable articles then to be conveyed) is established in different ones of the guide units and an operating position (corresponding to the neck size of the unstable articles then to be conveyed) is selected by the first actuator, and the unstable articles are thereafter urged along the article conveying path by the second actuator. When unstable articles having the predetermined different size neck portions are thereafter to be conveyed, the operating position is changed by the first actuator to the other operating position (corresponding to the neck size of the unstable articles to then be conveyed), and these unstable articles are thereafter urged along the article conveying path by the second actuator.

As can be appreciated from the foregoing, this invention provides an improved conveying device for conveying unstable articles and, particularly, for conveying unstable articles, such as plastic bottles or containers, having different size neck portions with a neck ring thereon.

What is claimed is:

1. A conveying device adapted for conveying unstable articles having a neck portion with a neck ring thereon, said system comprising:

a first guide unit having spaced connectors with neck ring engagable elements thereon spaced from one another a distance sufficient to receive the neck portions of unstable articles therebetween and engage the neck rings of the unstable articles;

a second guide unit having spaced connectors with neck ring engagable elements thereon spaced from one another a distance sufficient to receive the neck portions of unstable articles therebetween and engage the neck rings of the unstable articles, said neck ring engagable elements of said first and second guide units establishing an article conveying path and said spacing between said neck ring engagable elements of said first guide unit being different from that of said spacing between said neck ring engagable elements of said second guide unit so that unstable articles having substantially two different size neck portions can be conveyed along said article conveying path along either of said engagable elements of said first and second guide units;

a first actuator enabling relative movement between said first and second guide units to establish first and second operating positions whereby in said first operating position said neck ring engagable elements of said first guide unit engage unstable articles to be conveyed along said article conveying path and whereby in said second operating position said neck ring engagable elements of said second guide unit engage unstable articles to be conveyed along said article conveying path; and a second actuator for urging the unstable articles along said article conveying path.

2. The device of claim 1 wherein said spaced connectors have end portions terminating as said neck ring engagable elements.

3. The device of claim 2 wherein said neck ring engagable elements are contact strips mounted on said end portions of said spaced connectors.

4. The device of claim 1 wherein said neck ring engagable elements of said first guide unit are spaced from said neck ring engagable portions of said second guide unit when in said first operating position and are adjacent to said neck ring engagable portions of said second guide unit when in said second operating position.

5. The device of claim 4 wherein each of said first and second guide units includes a substantially U-shaped channel member having a bridging portion and a pair of connector portions forming said spaced connectors with said U-shaped channel member of one of said guide units being within said U-shaped channel member of the other of said guide units with said spaced connectors of said guide units being spaced different distances from one another to enable movement of one of said guide units relative to the other of said guide units between said first and second operating positions.

6. The device of claim 1 wherein said spaced connectors of said first and second guide units have protrusions to facilitate spacing adjustment therebetween.

7. The device of claim 1 wherein said first actuator includes an actuating unit and a control unit for controlling relative movement between said first and second guide units to establish said first and second operating positions.

8. The device of claim 7 wherein said actuating unit of said first actuator includes an air cylinder with a piston connected with one of said first and second guide units, and wherein said control unit of said first actuator is an air controller connected with said air cylinder for controlling said relative movement between said first and second guide units.

9. The device of claim 8 wherein said control unit controls introduction of air into said air cylinder for causing withdrawal of said piston into said air cylinder, and wherein said first actuator includes a spring within said air cylinder for urging extension of said piston from said air cylinder when said air controller causes discharge of air from said air cylinder.

10. The device of claim 7 wherein said actuating unit of said first actuator includes a displaceable rod connected with one of said first and second guide units, and wherein said control unit of said first actuator includes a lever unit connected with said displaceable rod to displace said rod and thereby cause said relative movement between said first and second guide units.

11. The device of claim 1 wherein said second actuator includes an air conveyor having a plenum and air ducts for directing air toward said article conveying path established by said spaced connectors to urge the unstable articles along said article conveying path.

12. The device of claim 1 wherein said second actuator includes a movable belt engagable with the unstable articles for urging the unstable articles along said article conveying path established by said spaced connectors.

13. A conveying device adapted for conveying unstable articles having a neck portion with a neck ring thereon, said system comprising:

a first guide unit having spaced connectors extending from a bridging connector with said spaced connectors having end portions with neck ring engagable elements thereon spaced from one another a distance sufficient to receive the neck portions of unstable articles therebetween and engage the neck rings of the unstable articles;

a second guide unit having spaced connectors extending from a bridging connector with said spaced connectors having end portions with neck ring engagable elements thereon spaced from one another a distance sufficient to receive the neck portions of unstable articles therebetween and engage the neck rings of the unstable articles, said neck ring engagable elements of said first and second guide units establishing an article conveying path and said spacing between said neck ring engagable elements of said first guide unit being different from that of said spacing between said neck ring engagable elements of said second guide unit so that unstable articles having substantially two different size neck portions can be conveyed along said article conveying path along either of said engagable elements of said first and second guide units;

a first actuator including an actuating unit and a control unit enabling relative movement between said first and second guide units to establish first and second operating positions whereby in said first operating position said neck ring engagable elements of said first guide unit are spaced from said neck ring engagable elements of said second guide unit so that said neck ring engagable elements of said first guide unit engage unstable articles to be conveyed along said article conveying path and whereby in said second operating position said neck ring engagable elements of said second guide unit are adjacent to said neck ring engagable elements of said first guide unit so that said neck ring engagable elements of said second guide unit engage unstable articles to be conveyed along said article conveying path; and a second actuator for urging the unstable articles along said article conveying path.

14. The device of claim 13 wherein said neck ring engagable elements are contact strips mounted at said end portions of said spaced connectors.

15. The device of claim 13 wherein said spaced connectors and said bridging connector are formed as a substantially U-shaped channel at each of said first and second guide units.

16. The device of claim 13 wherein said actuating unit of said first actuator includes one of a pneumatic unit and a mechanical unit connected with one of said first and second guide units to cause relative movement between said first and second guide units, and wherein said control unit of said first actuator includes one of a pneumatic and a mechanical controller for controlling movement of said one of said first and second guide units relative to the other of said first and second guide units to thereby cause establishment of said first and second operating positions.

17. The device of claim 13 wherein said second actuator includes at least one of an air conveyor and a movable belt to urge the unstable articles along said article conveying path.

18. A conveying device adapted for conveying unstable articles having a neck portion with a neck ring thereon, said device comprising:

a first guide unit having a substantially U-shaped channel member with a bridging portion and depending spaced and substantially parallel connector portions with neck ring engagable elements thereon spaced from one another a distance sufficient to receive the neck portions of unstable articles therebetween and engage the neck rings of the unstable articles;

a second guide unit within said first guide unit and having a substantially U-shaped member with a bridging portion and depending spaced and substantially parallel connector portion with neck ring engagable elements thereon spaced from one another a distance sufficient to receive the neck portions of unstable articles therebetween and engage the neck rings of the unstable articles, said neck ring engagable elements of said first and second guide units establishing an article conveying path and said spacing between said neck ring engagable elements of said first guide unit being greater than that of said spacing between said neck ring engagable elements of said second guide unit so that unstable articles having substantially two different size neck portions can be conveyed along said article conveying path along either of said engagable elements of said first and second guide units;

a first actuator connected with said bridging portion of one of said first and second guide units enabling relative movement between said first and second guide units to establish first and second operating positions whereby in said first operating position said neck ring engagable elements of said first guide unit are spaced from said neck ring engagable elements of said second guide unit so that said neck ring engagable elements of said first guide unit engage unstable articles to be conveyed along said article conveying path and whereby in said second operating position said neck ring engagable elements of said second guide unit are adjacent to said neck ring engagable elements of said first guide unit so that said neck ring engagable elements of said second guide unit engage unstable articles to be conveyed along said article conveying path; and a second actuator including a pneumatic and a mechanical unit for urging unstable articles along said article conveying path.

19. The device of claim 18 wherein said pneumatic unit of said second actuator includes an air conveyor having an air plenum and air ducts for directing air from said air plenum toward the unstable articles then in said article conveying path to urge the unstable articles along said article conveying path.

20. The device of claim 18 wherein said mechanical unit of said second actuator includes a movable belt for engaging the unstable articles then in said article conveying path to urge the unstable articles along said article conveying path.

* * * * *